(12) United States Patent
Pekkala et al.

(10) Patent No.: US 7,704,398 B2
(45) Date of Patent: *Apr. 27, 2010

(54) METHOD AND APPARATUS FOR PURIFICATION OF AN AQUEOUS SOLUTION FROM DROPLETS OF EXTRACTION SOLUTION

(75) Inventors: Pertti Pekkala, Espoo (FI); Raimo Kuusisto, Espoo (FI); Juhani Lyyra, Espoo (FI); Bror Nyman, Ulvila (FI); Eero Ekman, Pori (FI)

(73) Assignee: Outotec Oyj, Espoo (FI)

( * ) Notice: Subject to any disclaimer, the term of this patent is extended or adjusted under 35 U.S.C. 154(b) by 605 days.

This patent is subject to a terminal disclaimer.

(21) Appl. No.: 11/628,868

(22) PCT Filed: Jun. 9, 2005

(86) PCT No.: PCT/FI2005/000269

§ 371 (c)(1),
(2), (4) Date: Dec. 8, 2006

(87) PCT Pub. No.: WO2005/120676

PCT Pub. Date: Dec. 22, 2005

(65) Prior Publication Data

US 2007/0210000 A1 Sep. 13, 2007

(30) Foreign Application Priority Data

Jun. 10, 2004 (FI) .................................. 20040799

(51) Int. Cl.
*B01D 11/00* (2006.01)
*B01D 21/02* (2006.01)
*B01D 11/04* (2006.01)

(52) U.S. Cl. .................. 210/634; 210/802; 210/511; 210/521; 210/522; 210/540; 422/256

(58) Field of Classification Search ................. 210/634, 210/702, 801, 519, 511, 522, 799, 800–804, 210/DIG. 5, 538, 540; 422/256–259
See application file for complete search history.

(56) References Cited

U.S. PATENT DOCUMENTS 2,681,269 A * 6/1954 Bergstrom ................... 422/257
3,894,943 A 7/1975 Hartmann et al.
5,474,688 A * 12/1995 Hedrick et al. ............... 210/802

(Continued)

FOREIGN PATENT DOCUMENTS

WO WO 03/097205 A1 11/2003

(Continued)

*Primary Examiner*—Krishnan S Menon
*Assistant Examiner*—Katherine Zalasky
(74) *Attorney, Agent, or Firm*—Buchanan Ingersoll & Rooney PC (57) ABSTRACT

The invention relates to a method and apparatus with which the aqueous solution from liquid-liquid extraction in the hydrometallurgical recovery of metals is purified from droplets of organic extraction solution. The aqueous solution is treated in a settling tank, where it is made to flow through a flow channel area with a reduced cross-section that extends over the width of the tank at least at one point. The flow channels are located in the lower section of the droplet coalescer according to the invention, with the upper section of the device being mainly solid.

26 Claims, 4 Drawing Sheets

U.S. PATENT DOCUMENTS

| | | |
|---|---|---|
| 5,527,461 A | 6/1996 | Hill |
| 5,656,173 A * | 8/1997 | Jordan et al. ............... 210/703 |
| 6,083,400 A * | 7/2000 | Nyman et al. ............... 210/634 |
| 6,132,615 A | 10/2000 | Nyman et al. |
| 6,171,465 B1 * | 1/2001 | Compton ................... 204/570 |
| 6,423,238 B2 | 7/2002 | Hernandez |
| 6,432,370 B1 * | 8/2002 | Nyman et al. ............... 422/256 |
| 2007/0246418 A1 | 10/2007 | Pekkala et al. |

FOREIGN PATENT DOCUMENTS

WO    WO 2004/108245 A1    12/2004

* cited by examiner

METHOD AND APPARATUS FOR PURIFICATION OF AN AQUEOUS SOLUTION FROM DROPLETS OF EXTRACTION SOLUTION

FIELD OF THE INVENTION

The invention relates to a method and apparatus with which the aqueous solution from liquid-liquid extraction in the hydrometallurgical recovery of metals is purified from droplets of organic extraction solution.

BACKGROUND OF THE INVENTION

The hydrometallurgical recovery of metals often comprises the following stages: the leaching of a concentrate or ore, liquid-liquid extraction and the precipitation or reduction of the metal. Leaching may be bioleaching or dilute acid leaching, from which the aqueous solution is routed to liquid-liquid extraction. In extraction, organic extraction solution is mixed, in an extraction cell (mixer-settler) or in a column, into an aqueous solution that contains a metal, usually in ion form or as a compound along with several impurities. The valuable metal to be refined reacts selectively with the organic extraction solution, whereby it is separated from the aqueous solution into the extraction chemical in a pure form. The aqueous solution depleted of valuable metals, i.e. the raffinate, is routed back to concentrate/ore leaching. The valuable metal or substance bound to the extractant can then be separated from the organic solution back into an aqueous solution (stripping) with the inverted chemical reaction to extraction, and can then be recovered again from there as a product, for instance by precipitation or reduction to metal. Reduction may be electrolysis for example.

The extraction process is thus the mixing together of liquids that are physically insoluble in each other into droplets or a dispersion in the mixing section of the extraction apparatus, and after chemical mass transfer, the droplets in the dispersion are made to coalesce back into the original layers of liquid in the settling section or settler. Intensive mixing or a significant change in the surface chemistry conditions of the process may result in very small droplets, which require a lot of time to disengage to their own liquid phase. These droplets do not necessarily have time to disengage in the actual settling section of the extraction step, but move further along the process with the other phase.

The entrainment of extraction solution in process stages occurring in the aqueous phase such as leaching or electrolysis (electrowinning) causes process disturbances. Bioleaching is particularly susceptible to disruption, because organic extraction solution is toxic to the bacteria that maintain bioleaching. In addition, the purity of metal produced by electrowinning suffers from the extraction solution that accumulates in the electrolysis tanks. Therefore, electrolyte that enters electrolysis must also be purified carefully from droplets of extractant. A maximum of only 3-5 ppm extraction solution is permitted in the electrolyte.

For example, in the hydrometallurgical recovery of copper, a mixer-settler apparatuses are used which are principally laid out horizontally. Their operation has improved in recent years to the extent that the amount of extraction solution entrained in the aqueous solution is in the range of about 10 ppm. However, it has been found that the permanent reduction of the amount of entrained droplets below 5 ppm cannot be accomplished using only a mixer-settler apparatus.

The separation of small droplets from another solution occurs using the droplet coalescence principle. When droplets are made larger, they can be separated from another solution due to the effect of gravity. There are several types of droplet coalescers, for instance plate coalescers, fibre/mesh coalescers, packed bed coalescers and membrane coalescers.

Nowadays, for instance, a kind of packed bed organic droplet coalescing device, which is in fact a pressure filter, such as the one described in U.S. Pat. No. 6,015,502 is used for purifying the electrolyte. A filler such as anthracite is used in the pressure filter to bind the droplets. The filler is regenerative at regular intervals, so that its pores do not get clogged too much with organic solution. In practice, several devices connected in parallel are required for purification, for example four to six units in a large copper extraction facility. The apparatus is expensive and its operating features are complicated. Since the flow direction of solution has to be changed from time to time, this results in the fact that solutions from different operating stages are mixed together disadvantageously. At the same time, some of the electrolyte and extraction solution is also lost.

The amount of raffinate, the stream of aqueous solution from the extraction stage that is routed back to leaching, is considerably greater than the amount of electrolyte in contact with organic solution in the stripping stage. Even if the apparatus described in U.S. Pat. No. 6,015,502 were used to purify electrolyte, its use in raffinate purification would not be economically viable in practice. Tanks to purify the raffinate are proposed, into which slotted plates are placed according to various embodiments. The distance between the plates is usually over 10 mm and when the size of the droplets of extraction solution is less than 50 microns, the cleaning effect generally remains modest, far less than half the amount of extraction solution contained in the raffinate.

PURPOSE OF THE INVENTION

The purpose of the method and apparatus of the invention is to treat the aqueous solution exiting the hydrometallurgical liquid-liquid extraction of metals by performing the physical separation of extraction solution droplets from the aqueous solution in a simple and economical way. The aqueous solution may be either one exiting stripping that contains valuable metals or a raffinate exiting extraction itself, which is depleted of the valuable substance.

SUMMARY OF THE INVENTION

The characteristic features of the invention will be made apparent in the attached claims.

In the method according to the invention the aqueous solution exiting liquid-liquid extraction occurring during the hydrometallurgical recovery of metals is treated in a after-settler type of settling tank, where it is made to flow from the feed end of the tank towards the rear end. The aqueous solution is made to flow through a flow channel area with a reduced cross-section that extends over the width of the tank at least at one point. The flow channels are located in the lower section of the droplet coalescer according to the invention, with the upper section of the device being mainly solid. In the droplet coalescer zone the aqueous solution is made to flow through flow channels, which have a cross-sectional area of 10-25% of the total cross-sectional area of the solution depth.

Flow channels are grouped so as to be overlapping and inclined obliquely downwards in the direction of flow. The depth of the flow channels is in the region of 2-6 mm, preferably 3-5 mm. The majority of the solution flow is laminar, but the upper part of the flow channel is suitable for forming a swirl, which makes the droplets of extraction solution collide with each other and thus form larger droplets. The surfaces of the flow channels are roughened and/or otherwise shaped to create swirls. The shaping also causes slowing down the movement of the droplets of extraction solution and thereby their collisions. The depth of the roughening is in the region of 0.3-1.0 mm and/or the depth of the shaping is in the region of 2-3 mm. The large drops formed rise upwards from the aqueous solution by the effect of gravity and combine on the surface of the settling tank to form a layer of extraction solution.

The extraction solution that has already disengaged from the aqueous solution is routed to flow onwards via guide channels located in the upper section of the droplet coalescer. In this way the organic solution does not mix into the aqueous solution again. The guide channels are located above each other and are pointed upwards in the direction of flow of the solution. The number of guide channels is ⅙-⅓ of the number of flow channels.

In addition to flow channels, the settling tank may be equipped with at least one device that diverts the flow vertically upwards from the bottom. Preferably the number of turning elements is the same as the number of droplet coalescing devices. By means of the turning elements the direction of the flow of aqueous solution is diverted at intervals from horizontal to vertical, which helps the droplets of organic solution to separate. The turning element allows the flow to be diverted across the entire width of the settling tank.

According to the invention, the apparatus intended for settling an aqueous solution from the hydrometallurgical liquid-liquid extraction of metals comprises an essentially rectangular settling tank, which is made up of a feed end and a rear end, sidewalls and a bottom.

A minimum of one droplet coalescing device is situated in the settling tank in the direction of flow. The droplet coalescer is arranged to be essentially in an upright position and it extends from one side of the tank to the other. The device consists of several adjacent elements, which extend from the bottom of the tank to above the surface of the liquid. The elements are mainly solid, but their lower section is equipped with flow plates with a roughened and/or shaped surface, directed obliquely downwards from the direction of flow. Almost the whole solution stream is directed via the flow channels formed between the flow plates. The flow plates are located at a distance which corresponds to 10-25% of the height of the droplet coalescer.

According to one embodiment of the invention, the profiling of the flow plates is formed of rounded protrusions on the surface of the plate. The height of the rounded protrusions may be in the region of 2-3 mm. Preferably the upper surface of the plate is provided with protrusions and the lower surface is roughened, so that the upper surface of the actual flow channel is roughened and the lower surface provided with protrusions. Both surfaces of the plate may also be roughened. The roughening is in the region of 0.3-1 mm. In addition the whole plate may be made undulating.

Some guide plates are located in the upper section of the droplet coalescer. The thin layer of organic extraction solution that has separated onto the surface of the aqueous solution is made to flow via the guide plates located in the upper section of the device. The number of guide plates is ⅙-⅓ that of the flow plates. The guide plates are like the flow plates in shape.

According to one embodiment of the invention, the settling tank is provided after the droplet coalescer with solid turning elements directed upwards from the bottom. The turning element changes the direction of the solution stream from the flow channel zone from horizontal to almost vertical and at the same time achieves the coalescence of the small droplets. The height of the vertical plates is 30-50% of the total depth of solution in the tank.

According to one embodiment of the invention, the aqueous solution to be purified is brought to the lower section of the settling tank via a feed pipe, from which it is distributed into the tank via several feed units directed towards the front corner of the tank. The feed pipe preferably forms part of a baffle, which is situated between the front wall of the tank and the first droplet coalescer.

According to one embodiment of the invention, the purified aqueous solution is removed from the rear of the tank via several suction units, which are directed to suck out the solution from the rear corner of the tank. The pure aqueous solution is collected from the suction units in a collecting pipe and routed to the following process stage, which is for example leaching or metal recovery.

According to the invention the extraction solution that has accumulated on the surface of the aqueous solution is removed from the rear section of the tank as the overflow and its recovery is specified to be larger than the layer of extraction solution formed during settling. The amount of surface solution to be removed is preferably in the range of 10-50%, preferably 25-35% of the amount of aqueous solution fed into the tank.

According to one embodiment of the invention, the bottom of the settler is inclined, getting deeper towards the rear. The slope of the bottom is preferably 2-8 degrees to the horizontal.

The purification of the aqueous solution in liquid-liquid extraction processes is not limited to the extraction process of any particular metal. The method and apparatus described above are, however, well suited when the valuable substance to be recovered is copper.

LIST OF DRAWINGS

The apparatus according to the invention is further described by means of the appended drawings, in which.

DETAILED DESCRIPTION OF THE INVENTION

Figure 1:
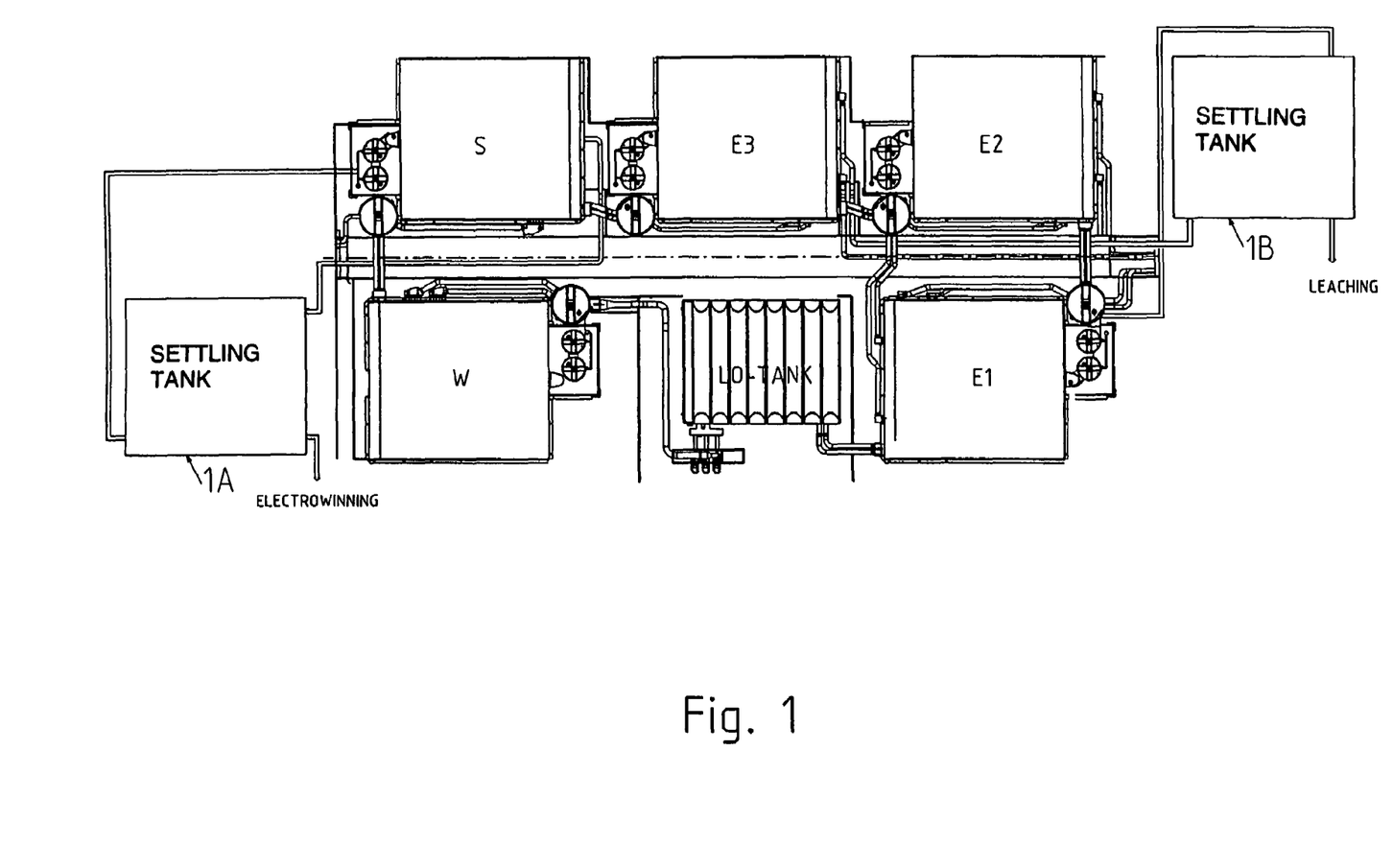
FIG. 1 shows one extraction unit arrangement according to the invention seen from above.

FIG. 1 shows how a settling tank according to the invention is connected to the rest of the extraction process. The extraction process in the diagram includes extraction steps E1, E2 and E3, organic solution settler LO, one washing stage W and the stripping step S. In this connection two aqueous solution settling tanks are now drawn. Tank 1A is intended for the aqueous solution which comes from the stripping step and includes a valuable metal. Tank 1B is intended for the raffinate coming from extraction, which has released its valuable metal and is circulated back to concentrate or ore leaching.

Figure 2:
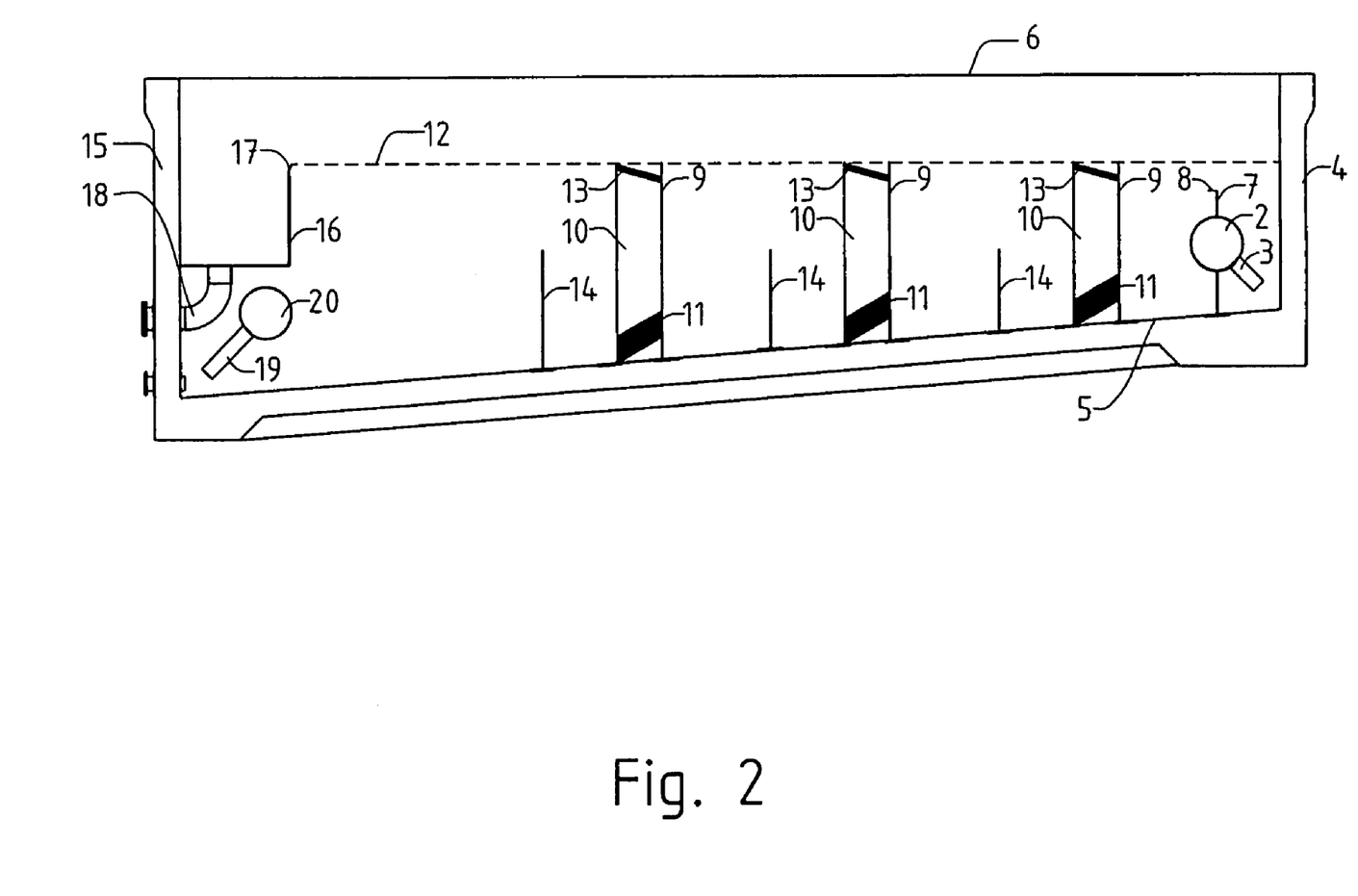
FIG. 2 presents a settling tank according to the invention as a longitudinal cross-section.

FIG. 2 shows a settler 1 according to the invention in more detail. Aqueous solution is fed into the tank through a distribution pipe 2 and the feed units 3 in it to the vicinity of the feed end 4 and the bottom 5. The upper edge of the tank is marked with number 6. It is preferable to feed the aqueous solution diagonally downwards towards the front corner. The feed pipe is preferably part of the vertical plate 7 that divides the feed end. The horizontal upper edge 8 of the vertical plate 7 is at a depth of 30-50% of the effective depth of the tank.

The size of the droplets of extraction solution is made to grow by means of a droplet coalescing device 9, of which there is at least one placed in the settler for that purpose. In the settling tank in FIG. 2 there are three devices, and this can be varied according to need between 1 and 5. Each device 9 extends from one side of the settler to the other and in practice is made up of several cassettes placed side by side. The length of the device in the direction of flow is 0.1-1 m, preferably 0.3-0.7 m. The device is solid in the middle 10 and the flow plate cassette 11 that actually increases the droplet size is located in the lower section of the device. Each cassette is made up of several flow plates placed on top of each other, between which flow channels are formed. The droplet coalescer forms a dense flow barrier in the tank, so that the entire flow of aqueous solution takes place via the flow channels. The flow plates are positioned at a distance from each other of 2-6 mm in elevation. The flow plates are angled diagonally downwards in the direction of flow at an angle of 10-45 degrees, preferably at 15-30 degrees to the bottom 5.

The number of flow channels and flow plates is chosen so that the flow in the channels is largely laminar. When the viscosity of the aqueous solution is for instance in the range of 0.7-3 cP, it is preferable to keep the flow rate around 0.05-0.20 m/s.

The droplet coalescing device extends above the surface of the liquid 12 in the settler. Situated in the upper section of the device, below the surface of the liquid, there are several guide plates forming a connecting channel cassette 13, via which the extraction solution concentrated in the surface layer is made to move forwards in the tank evenly. The guide plates forming the connecting channel are basically the same type as the flow plates in the bottom of the device. The connecting channel plates, however, when seen in the direction of flow, are inclined upwards at an angle of 5-25 degrees. The number of connecting channel guide plates is far less than that of the flow plates, so that there are $\frac{1}{6}$-$\frac{1}{3}$ of the number of flow plates. The flow rate of the organic solution in the connecting channel is dimensioned to be essentially the same as that of the aqueous solution in the flow channels.

The surfaces of both the flow plates and the guide plates are roughened or otherwise shaped so that there is a roughening of around 0.3- 1.0 mm in height in their surface and/or a shaping of 2-3 mm high. In particular, the lower surface of the flow plate, that is, the surface that forms the upper surface of the flow channel is preferably shaped so that it causes a slight mixing motion. The movement of the droplets of organic solution that are slowly separating upwards is slowed by the effect of the shaped surface and they stick partially to the shaped surface, particularly if it is roughened. The droplets collide with each other on such surfaces and combine into bigger drops. As the size of the drops increases, the flow detaches the drops and on exiting the flow channels, they have grown to such a size that as a result of buoyancy they rise more quickly towards the surface of the settling tank. The settling tank can further be equipped with a turning element 14 located after the droplet coalescer. The elements extend from one side of the tank to the other and are solid. They are located in relation to the droplet coalescers so that they are slightly nearer the previous coalescer in the direction of flow than they are to the following one. The upper edge of the turning element extends to a height from the bottom, which is a maximum of half of the depth of liquid in the tank. The number of turning elements is preferably the same as the number of droplet coalescing devices.

The droplet coalescer are grouped in the settler so that the proportion of the feed space before the first device is 15-25% of the length of the tank and the proportion of the rear space after the last device 25-40%. Between the last droplet coalescer and the back wall 15 of the settler there remains a space, which is 2-4 times longer than the space between the devices in the tank. After the final coalescer and the turning element, the entrained droplets of extraction solution in the aqueous solution have grown to such an extent that they almost all rise to the surface in the rear space of the settler at the latest, which is 25-40% of the total tank length. The surface layer containing organic extraction solution flows over the essentially horizontal overflow edge 17 of the discharge launder 16 that extends over the entire tank. The solution is removed from the launder via unit 18 and is routed to some suitable mixer.

The bottom layer containing pure aqueous solution is sucked out through several suction units 19 near the bottom and rear wall. The suction units are directed towards the bottom and rear end of the tank. The aqueous solution is conducted from the suction units via one or several collector pipes 20 on to the next stage. When one collector pipe is in use, it extends across the entire rear space of the tank. According to one embodiment of the invention, two collector pipes are used, of which each extends into its own section of the rear space of the settler. It is however also advantageous that all the aqueous solution is recovered from the same side of the tank, so that one collector pipe extends across the entire width of the tank, even though its suction zone is only part of the tank.

When more solution is collected in the organic solution discharge launder than what is required for the layer of extraction solution that has accumulated on the surface, the amount of entrained droplets of extraction solution in the aqueous solution is reduced at the same time. When the amount of solution to be taken from the bottom is decreased in relation to the amount of solution fed into the settler, the proportion of the surface layer can be increased, since it corresponds to the difference of the solution fed and the aqueous solution removed.

As shown in FIG. 2, the bottom 5 of the settler may be inclined towards the rear space, becoming deeper. The slope of the bottom may be in the range of 2-8 degrees to the horizontal.

Figure 3:
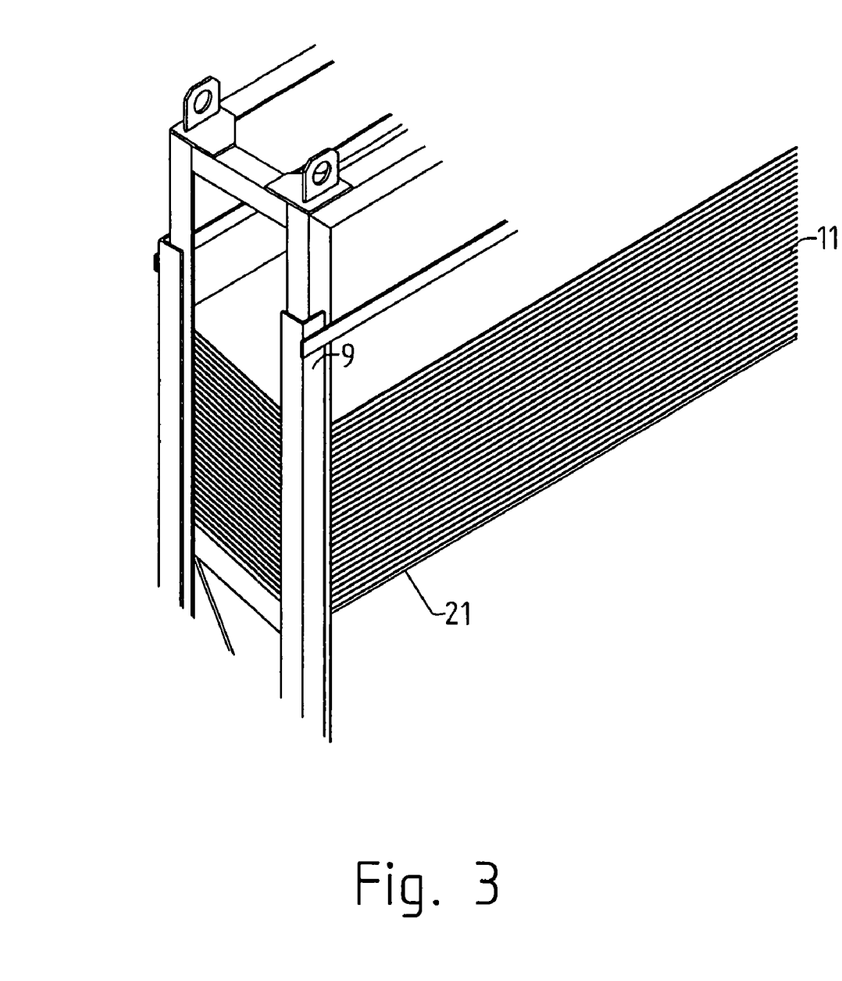
FIG. 3 is a cut three-dimensional image of the flow plates of a droplet coalescer.

FIG. 3 shows a partial three-dimensional view of the flow plate cassette 11 composed of the flow plates 21 of the droplet coalescer device 9.

Figure 4A:
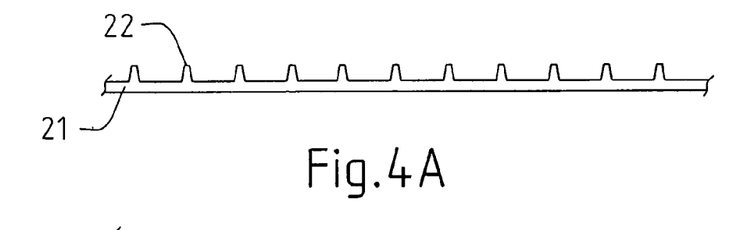
FIGS. 4A and 4B show the upper and lower surfaces of a flow plate according to the invention.
Figure 4B:
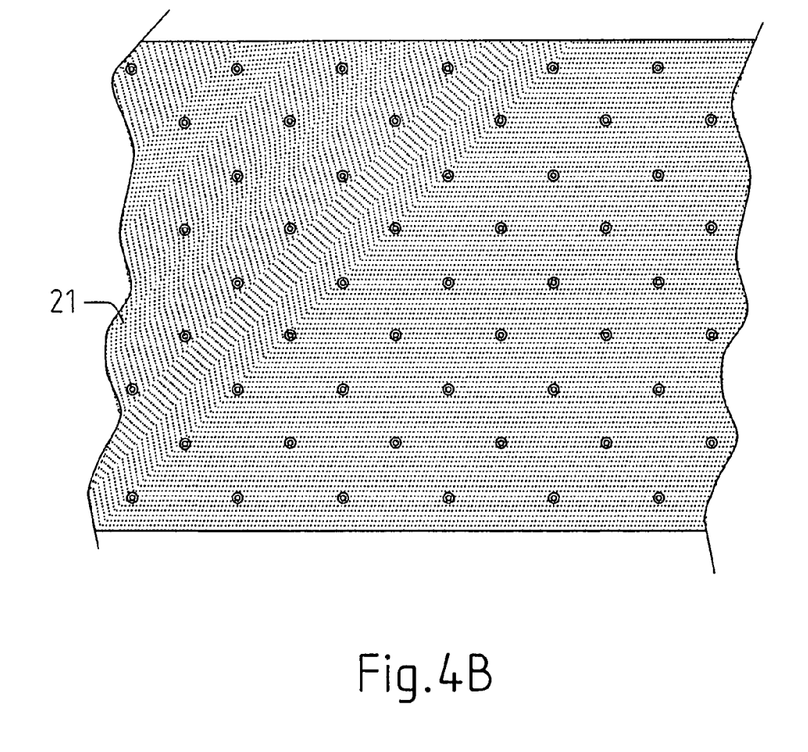

FIGS. 4A and 4B show the upper and lower surfaces of a flow plate of one droplet coalescer. In FIG. 4A, protrusions 22 have been formed on the surface of flow plate 21 at regular intervals, which deflect the flow and help the small droplets to combine with each other. The protrusions in the drawing are circular, which achieves a smooth flow. Preferably the protrusions cover 10-50% of the surface of the plate. According to one embodiment, the surface of the plate is also slightly undulating, which achieves a vertical change in direction for the advancing streams. FIG. 4B shows the roughened surface of one flow plate, of which the beneficial effects are described above.

The invention is not restricted only to the embodiments presented above but modifications and combinations of them are possible within the framework of the concept of the invention included in the patent claims.

The invention claimed is:

1. A method for the physical purification of an aqueous solution, obtained from a liquid-liquid extraction occurring during the hydrometallurgical recovery of metals, from droplets of organic extraction solution, comprising:

introducing an aqueous solution containing droplets of organic extraction solution obtained from a liquid-liquid extraction occurring during the hydrometallurgical recovery of metals into a settling tank comprising:
  a front end;
  a rear end; and
  at least one vertically extending droplet coalescer extending across the settling tank at least one point, comprising:
    a flow channel zone that is located in a lower section of the settling tank and comprising a plurality of flow channels inclined obliquely downwards in the direction of flow and wherein each flow channel comprises one or more surfaces that are roughened, shaped to cause swirling, or a combination of these;
    a solid center portion; and
    a guide channel portion located in an upper section of the settling tank and comprising a plurality of guide channels inclined obliquely upwards in the direction of flow and which comprise surfaces that are roughened, shaped to cause swirling, or a combination of these; and
flowing the aqueous solution containing droplets of organic extraction solution through the flow channel zone;
coalescing in the flow channel the droplets of organic extraction solution to a sufficient size that they rise toward an upper surface of the settling tank to form a separated organic extraction solution;
flowing the separated organic extraction solution through the guide channels in the upper section of the droplet coalescer; and
removing the separated aqueous solution and the separated organic extraction solution from the settling tank in separate streams.

2. A method according to claim 1, wherein the flow channel zone has a cross-sectional area that is 10-25% of a cross-sectional area of the settling tank from the bottom up to the liquid level.

3. A method according to claim 1, wherein the flow channel zone comprises several overlapping flow channels of a height of around 2-6 mm.

4. A method according to claim 1, wherein the height of the roughening is in the range of 0.3-1 mm and/or the height of the shaped profile is in the range of 2-3 mm.

5. A method according to claim 1, wherein the guide channels are of the same form as the flow channels.

6. A method according to claim 5, wherein number of guide channels in the droplet coalescer is 1/6-1/3 of the number of flow channels in the flow channel zone of the droplet coalescer.

7. A method according to claim 1, wherein the number of droplet coalescers in the settling tank is between 1-5.

8. A method according to claim 1, wherein the settling tank further comprises at least one element to divert the stream of aqueous solution vertically upwards from the lower section of the settling tank, which is located behind the flow channel zone in the direction of flow.

9. A method according to claim 8, wherein the number of elements diverting the stream of aqueous solution in the settling tank is the same as the number of droplet coalescers in the settling tank.

10. A method according to claim 1, wherein the introducing of the aqueous solution containing droplets of organic extraction solution comprising feeding the aqueous solution into a lower section of the settling tank obliquely downwards into a front corner of the settling tank in several sub-streams.

11. A method according to claim 1, wherein the removing of the aqueous solution from the rear end of the settling tank comprises sucking the aqueous solution out of the rear end of the settling tank in several sub-streams obliquely upwards from the lower section of the settling tank.

12. A method according to claim 1, wherein the removing of the separated organic extraction solution comprises flowing the separated organic extraction solution from the rear end of the settling tank over an overflow edge into a discharge launder that extends across the entire width of the settling tank, and wherein the amount of separated organic extraction solution removed is 10-50% of the amount of organic extraction solution fed into the settling tank.

13. A settling apparatus for the purification of aqueous solution, obtained from a liquid-liquid extraction occurring during the hydrometallurgical recovery of metals, from droplets of organic extraction solution, said apparatus comprising:
  an essentially rectangular-shaped settling tank comprising:
    a feed end;
    a rear end;
    sides;
    a bottom;
  at least one aqueous solution feed connection at the feed end of the settling tank;
  at least one organic extraction solution removal connection at the rear end of the settling tank;
  at least one droplet coalescer extending from one side of the tank to the other and from the bottom of the tank to above the surface of the liquid, comprising:
    a solid center section;
    a lower section comprising a flow plate cassette containing several overlapping flow plates which have roughened and/or shaped surfaces and which are obliquely directed downwards in the direction of flow; and
    an upper section comprising a connecting channel cassette containing guide plates for the flow of organic extraction solution, which are directed obliquely upwards in the direction of flow.

14. An apparatus according to claim 13, wherein the flow plates are directed downwards at an angle of 10-45 degrees to the bottom of the settling tank in the direction of flow.

15. An apparatus according to claim 13, wherein the distance of the flow plates are spaced apart from each other a distance of 2-6 mm, and the guide plates are spaced apart from each other a distance of 2-6 mm.

16. An apparatus according to claim 13, wherein the guide plates are directed obliquely upwards in the direction of flow at an angle of 5-25 degrees.

17. An apparatus according to claim 13, wherein the flow plates or guide plates or both have a surface roughness in the range of 0.3-1 mm or are otherwise shaped to have a height of around 2-3 mm from the plate surface.

18. An apparatus according to claim 13, wherein the surfaces of the flow and guide plates have an undulating profile.

19. An apparatus according to claim 17, wherein the flow plates or the guide plates, or both, contain rounded protrusions on an upper surface thereof and surface roughness on a lower surface thereof.

20. An apparatus according to claim 13, wherein the number of guide plates in connecting channel cassette is 1/6-1/3 of the number of flow plates in the flow plate cassette.

21. An apparatus according to claim 13, the number of droplet coalescers in the settling tank is between 1 and 5.

22. An apparatus according to claim 13, wherein the settling tank further comprises at least one solid turning element rising essentially vertically from the bottom of the settling tank, situated behind the droplet coalescer when seen in the direction of flow, extending from one side of the settling tank to the other side of the settling tank, and having a height which is at maximum half of the height of liquid level in the settling tank.

23. An apparatus according to claim 13, wherein the feed end of the settling tank further comprises an aqueous solution distribution pipe comprising several feed units located in a lower section of the settling tank and directed obliquely downwards towards a front corner of the settling tank.

24. An apparatus according to claim 23, wherein the aqueous solution distribution pipe forms part of a vertical plate that divides the feed end of the settling tank, and that has a height that is 30-50% of the effective depth of the settling tank.

25. An apparatus according to claim 13, wherein the rear end the settler further comprises several purified aqueous solution suction units directed obliquely downwards and connected to a collecting pipe.

26. The method according to claim 3, wherein the flow channels have a height of around 3-5 mm.

* * * * *